(12) United States Patent
Kubik et al.

(10) Patent No.: US 7,261,839 B2
(45) Date of Patent: Aug. 28, 2007

(54) TARNISH INHIBITING COMPOSITION AND ARTICLE CONTAINING IT

(75) Inventors: Donald Alfons Kubik, Dickenson, ND (US); Boris Varshal, Lynn, MA (US); Efim Ya. Lyublinski, Mayfield Heights, OH (US); Barbara Ann Nygaard, Circle Pines, MN (US)

(73) Assignee: Northern Technologies International Corp., Beachwood, OH (US)

( * ) Notice: Subject to any disclaimer, the term of this patent is extended or adjusted under 35 U.S.C. 154(b) by 439 days.

(21) Appl. No.: 10/676,760

(22) Filed: Oct. 1, 2003

(65) Prior Publication Data

US 2004/0063837 A1    Apr. 1, 2004

Related U.S. Application Data

(63) Continuation-in-part of application No. 10/453,303, filed on Jun. 3, 2003, now abandoned, which is a continuation of application No. 10/054,032, filed on Jan. 22, 2002, now abandoned.

(51) Int. Cl.
*C08K 3/00* (2006.01)
*C09K 3/00* (2006.01)
*C23F 11/00* (2006.01)

(52) U.S. Cl. .............................. 252/389.3; 252/389.52; 252/389.62; 524/430; 524/442

(58) Field of Classification Search ................ 524/430, 524/442; 252/389.3, 389.52, 389.62
See application file for complete search history.

(56) References Cited

U.S. PATENT DOCUMENTS

| | | | |
|---|---|---|---|
| 2,629,649 A | 2/1953 | Wachter et al. |
| 2,711,360 A | 6/1955 | Wachter et al. |
| 2,717,843 A | 9/1955 | Wachter et al. |
| 2,739,871 A | 3/1956 | Senkus |
| 2,829,080 A | 4/1958 | Fessler et al. |
| 2,986,447 A | 5/1961 | Raifsnider |
| 3,080,211 A | 3/1963 | Fessler et al. |
| 3,110,684 A | 11/1963 | Miller |
| 3,304,267 A | 2/1967 | Miller |
| 3,398,095 A | 8/1968 | Judd |
| 3,433,577 A | 3/1969 | Shick |
| 3,626,083 A | 12/1971 | Minter |
| 3,785,975 A | 1/1974 | Humphrey |
| 3,967,926 A | 7/1976 | Rozenfeld et al. |
| 4,051,066 A | 9/1977 | Miksic et al. |
| 4,098,720 A | 7/1978 | Hwa |
| 4,217,216 A | 8/1980 | Lipinski |
| 4,290,912 A | 9/1981 | Boerwinkle et al. |
| 4,626,283 A | 12/1986 | Martins et al. |
| 4,782,106 A | 11/1988 | Fricke et al. |
| 4,891,404 A | 1/1990 | Narayan et al. |
| 4,944,916 A | 7/1990 | Franey |
| 4,973,446 A | 11/1990 | Bernhard et al. |
| 4,973,448 A | 11/1990 | Carlson et al. |
| 4,983,661 A | 1/1991 | Ali et al. |
| 5,037,708 A | 8/1991 | Davitz |
| 5,139,700 A | 8/1992 | Miksic et al. |
| 5,154,886 A | 10/1992 | Franey et al. |
| 5,180,762 A | 1/1993 | Canova |
| 5,209,869 A | 5/1993 | Miksic et al. |
| 5,320,778 A | 6/1994 | Miksic et al. |
| 5,324,448 A | 6/1994 | Mayeaux |
| 5,344,589 A | 9/1994 | Miksic et al. |
| 5,462,983 A | 10/1995 | Bloembergen et al. |
| 5,500,465 A | 3/1996 | Krishnan et al. |
| 5,593,624 A | 1/1997 | Lewis |
| 5,715,945 A | 2/1998 | Chandler |
| 5,801,224 A | 9/1998 | Narayan et al. |
| 5,817,195 A | 10/1998 | Davitz |
| 5,817,721 A | 10/1998 | Warzelhan et al. |
| 5,855,975 A | 1/1999 | Miksic et al. |
| 5,871,668 A | 2/1999 | Heimann et al. |
| 5,880,078 A | 3/1999 | Bevilacqua, Jr. et al. |
| 5,882,441 A | 3/1999 | Davitz |
| 5,906,783 A | 5/1999 | Narayan et al. |
| 5,916,372 A | 6/1999 | Bevilacqua, Jr. et al. |
| 5,928,796 A | 7/1999 | Heimann et al. |

(Continued)

FOREIGN PATENT DOCUMENTS

EP    0 366 305    5/1990

(Continued)

*Primary Examiner*—Cephia D. Toomer
(74) *Attorney, Agent, or Firm*—Hudak, Shunk & Farine Co. LPA

(57) ABSTRACT

An effective tarnish inhibiting ("TI") polymer composition including a scavenger for hydrogen sulfide optionally in the presence of an acid gas such as sulfur dioxide, provides excellent protection against tarnishing of the lustrous surfaces of a silver object. When the composition is thermoformed into a box-like container or extruded as film which contains uniformly dispersed solid micron-sized particles of the scavenger chosen from zinc oxide and a silicate of an alkali metal in an amount no greater than 5% by weight of the polymer, it is transparent so that the condition of the stored silver may be assessed. A solid inert adjuvant may be added. All solid particles in the material have a primary particle size smaller than 53 µm which makes it possible to obtain the uniform dispersion. A silver object may be wrapped in the film, or stored in a sealed box so that the solid particles in the polymer are not coated on the surfaces of the silver object.

18 Claims, No Drawings

U.S. PATENT DOCUMENTS

| | | |
|---|---|---|
| 5,938,976 A | 8/1999 | Heimann et al. |
| 5,958,115 A | 9/1999 | Böttcher et al. |
| 5,969,089 A | 10/1999 | Narayan et al. |
| 5,983,598 A | 11/1999 | Quinones |
| 6,010,984 A | 1/2000 | Heimann et al. |
| 6,010,985 A | 1/2000 | Heimann et al. |
| 6,017,857 A | 1/2000 | Heimann et al. |
| 6,028,160 A | 2/2000 | Chandler et al. |
| 6,054,512 A | 4/2000 | Nelson et al. |
| 6,080,334 A | 6/2000 | Heimann et al. |
| 6,139,652 A | 10/2000 | Carrano et al. |
| 6,156,929 A | 12/2000 | Chandler et al. |
| 6,165,284 A | 12/2000 | Shubkin |
| 6,190,779 B1 | 2/2001 | Heimann et al. |
| 6,201,034 B1 | 3/2001 | Warzelhan et al. |
| 6,224,957 B1 | 5/2001 | Crook et al. |
| 6,242,371 B1 | 6/2001 | Quinones |
| 6,316,392 B1 | 11/2001 | Heimann et al. |
| 6,321,907 B1 | 11/2001 | Honstrater |
| 6,331,509 B1 | 12/2001 | Heimann et al. |
| 6,414,108 B1 | 7/2002 | Warzelhan et al. |
| 2003/0031583 A1 | 2/2003 | Reinhard |
| 2003/0220436 A1 | 11/2003 | Gencer |
| 2004/0069972 A1 | 4/2004 | Kubik et al. |
| 2004/0248486 A1 | 12/2004 | Hodson |
| 2005/0182196 A1 | 8/2005 | Khemani et al. |

FOREIGN PATENT DOCUMENTS

| | | |
|---|---|---|
| HU | 48857 | 7/1989 |
| WO | 02/27069 | 4/2002 |
| WO | 03/060197 | 7/2003 |
| WO | 03/062313 | 7/2003 |
| WO | 03/062346 | 7/2003 |

TARNISH INHIBITING COMPOSITION AND ARTICLE CONTAINING IT

CROSS-REFERENCE TO RELATED APPLICATIONS

This application is a continuation-in-part application of Ser. No. 10/453,303 filed 3 Jun. 2003, now abandoned which is a continuation of Ser. No. 10/054,032 filed 22 Jan. 2002 now abandoned.

FIELD

This invention relates to a particle-filled polymer for making a sealed container within which silver objects, especially those of essentially pure silver having lustrous surfaces, free of any protective coating, may be stored, without being tarnished, for extended periods in an oxygen-containing atmosphere with moisture and pollutants including traces of sulfur-containing gases such as hydrogen sulfide and sulfur dioxide.

THE PROBLEM

The tarnishing problem addressed herein is unrelated to corrosion which refers particularly to the reaction of oxygen or oxidizing agents including moisture, with the surface of a ferrous metal object. Protection against tarnishing by alloying silver to be stored in an atmosphere in which the concentration of hydrogen sulfide is in the range from less than 1 ppm to about 5 ppm, is a different problem; for example, it is known that the silver may be alloyed with a small amount of indium. The problem at hand is to find at least one active ingredient which functions as an effective tarnish-inhibiting ("TI") ingredient when it is not alloyed with the silver but is dispersed in the body of a container in which the silver is packed. The goal is to make an article of a polymer containing the TI ingredient in an amount sufficient to provide protection for the lustrous surfaces of a silver object against tarnishing for at least one year, essentially without sacrificing the physical properties of the polymer.

BACKGROUND OF THE INVENTION

The high proclivity of essentially pure silver objects to tarnish in an atmosphere containing only traces of hydrogen sulfide has resulted in numerous alloys which are reputed to be tarnish-resistant. Such alloys include 92.5% silver, 0.5% copper, 4.25% zinc, 0.02% indium, 0.48% tin, and 1.25% boron-copper alloy containing 2% boron and 98% copper disclosed in U.S. Pat. No. 4,973,446; a silver-palladium alloy containing 80-92.5% silver, 4-9% palladium, 0-10% copper and 0.5-1% indium or zinc disclosed in U.S. Pat. No. 5,037,708; an alloy containing 90-92.5% silver, 5.75-7.5% zinc, 0.25-1% copper, 0.25-0.5% nickel, 0.1-0.25% silicon, and 0-0.5% indium disclosed in U.S. Pat. No. 5,817,195; an alloy containing 90-94% silver, 3.5-7.35% zinc, 1-3% copper, and 0.1-0.25% silicon, disclosed in U.S. Pat. No. 5,882,441; an alloy containing at least 99.5% silver with the balance chosen from a readily oxidizable element such as aluminum, antimony, etc. disclosed in U.S. Pat. No. 6,139,652; and several other alloys all of which purport to be tarnish-resistant but fail to provide any evidence of such resistance, particularly in an atmosphere containing a trace quantity of hydrogen sulfide and/or sulfur dioxide.

The term "tarnish" refers to the dulling of the luster of a metallic silver surface progressing to shades of grey which intensify over time. More specifically "tarnish" refers to "a reaction product that occurs readily at room temperature between metallic silver and sulfur in any form. The well-known black film that appears on silver, results from reaction between atmospheric sulfur dioxide and metallic silver forming silver sulfide. The film is easily removed from the surface with a cleaning compound and is not a true form of corrosion." (See Hawleys's Condensed Chemical Dictionary, $14^{th}$ edition, 2001 John Wiley & Sons, New York). As shown below, sulfur dioxide per se, does not cause tarnishing of silver. Tarnishing is caused by hydrogen sulfide in the presence of oxygen and moisture, and the tarnishing may be aggravated by sulfur dioxide.

As a result of having to counteract the tarnishing of silver objects, made from either essentially pure, that is at least 99.5% pure silver, or from one of such alloys, a large variety of organic compounds have been developed to clean the tarnished surfaces. A recent such example is disclosed in U.S. Pat. No. 6,165,284.

U.S. Pat. No. 4,944,916 to Franey discloses mixing particles of copper and aluminum in a polymer to scavenge permeating gases and, in an illustrative example, tested the effect on a silver lead frame, sealed in a bag, and placed in a chamber which was evacuated and back-filled with pure hydrogen sulfide. Pure hydrogen sulfide in the absence of moisture and molecular oxygen produces no tarnishing on an essentially pure lustrous silver surface.

Box-like containers and synthetic resinous film of polyethylene ("PE"), polypropylene ("PP") and biodegradable polyester are most commonly used to package silver objects to protect them against contact with moisture and atmospheric pollutants; most preferred are transparent packages, and most preferably the polymer is low density polyethylene ("LDPE"). LDPE typically has a density less than 0.943 g/cc. By "transparent" is meant that the TI-polymer is to have substantially the same permeability to visible light as polymer which does not contain the TI ingredient(s). Such transparency allows one to view the silver object in the package and read this text in 12 point font with a piece of film laid over the text. The term "film" refers to polymer having a wall thickness sufficient to have substantially uniformly dispersed within it, enough of the TI ingredient to provide protection for a predetermined period. Further, the TI-polymer is to have smooth surfaces and a thickness which is substantially uniform, that is, its surfaces are smooth to the touch; e.g. smooth film typically has less than a ±0.0125 mm (0.5 mil or 0.0005") variance in thickness, when the thickness of the film is in the range from 0.025 mm (1 mil or 0.001") to 0.125 mm (5 mil or 0.005") thick; when such variances are due to particles of solid, or clumps of particles, at or near the surfaces of the film, the film is not smooth to the touch.

The terms "silver" and "silver objects" are used herein to refer to objects made of a predominantly silver alloy typically containing in excess of 90% silver, such as is used to make jewelry, cutlery commonly referred to as "sterling silver", cast figurines, busts or statues and other decorative furnishings; and, to refer to objects made of essentially pure silver, e.g. wiring in circuits of electronic devices, and jewelry, cutlery and similar objects referred to above, made of at least 99.5% silver. Though references which teach such alloys state that they are "tarnish resistant", the references are conspicuously free of any reference to, or any evidence of, the resistance of such alloys to the action of sulfur dioxide and/or hydrogen sulfide. Permeation of gases through the walls of a package continues throughout the time the silver is stored, unless the tarnish-causing gases are intercepted and scavenged. Though tests indicate that damage due to sulfur dioxide, per se, contributes essentially nothing to the tarnishing of silver, to the extent that its presence may exacerbate the damage due to hydrogen sulfide, it is desirable to scavenge both gases.

Coating silver, alloyed or not, with a coating impermeable to the gases is often not an option, because or one reason or the other, the silver cannot be coated with an invisible protective coating such as a clear lacquer. In some instances, the presence of the lacquer is objectionable even if the cost of coating is not; in others, the lacquer-coated object must be shipped or otherwise delivered after a long time, at least one year, looking as if they had been freshly manufactured, by which time the lacquer coating becomes discolored, even if the silver surface beneath is not.

The silver objects to be stored are therefore sealed in packages the walls of which are relatively permeable to trace quantities of hydrogen sulfide in an amount in the range as low as from 10 ppb (parts per billion) up to 5 ppm (parts per million) or more. Thus the expense of packaging the silver, alloyed or not, so that it is not susceptible to tarnishing over a long time, is justified.

Because atmospheric oxygen, and oxygen-containing compounds such as nitrogen oxides as well as sulfur dioxide and hydrogen sulfide typically damage packaging film, it is routinely protected with an aromatic triazole, or, a hindered phenol antioxidant such as a 2,4,6-tri-substituted phenol having a 4-substituent selected from a substitutable methylene carbon and a substitutable amine. The triazole and/or phenol provide protection against oxidation of the film when used in a relatively low concentration, typically less than 100 ppm, to scavenge free radicals generated by oxygen or sulfur atoms entering the film; it is believed that presence of the triazole and phenol facilitates the trapping of water molecules in synthetic resinous films. The phenol functions by generating a host of compounds as a result of free radicals generated by the action of the oxidizing agent, but oxygen is not scavenged in the film and neither is hydrogen sulfide or sulfur dioxide.

It is evident that a scavenger for hydrogen sulfide and sulfur dioxide in an article of arbitrary shape and cross-section, should provide protection against tarnishing by functioning as an active TI ingredient. By "active" is meant that the ingredient interacts with both, the hydrogen sulfide and any pollutant acid gas, particularly sulfur dioxide. The article is typically a synthetic resinous (hereafter also "plastic") film, or a box-shaped receptacle; in addition to silver objects, the film is used to protect electronic products having metallic silver circuits, and silver connectors packaged for storage and transportation; the box-shaped receptacle may be lined with cloth in which the silver is bedded. For shipment, metallic silver objects are commonly packaged in either a polyolefinic ("PO") bag or container thermoformed of PO; or, in a relatively large container into which the objects, wrapped in TI-containing film, are placed. Dispersed in the film, as an integral part thereof, is the active TI ingredient.

No packaging for substantially silver objects has been disclosed to maintain a lustrous silver surface free of tarnish for a period of at least one year at ambient temperature of about 23° C. in an atmosphere containing at least 10 ppb to 10 ppm of hydrogen sulfide and/or sulfur dioxide, individually or together.

SUMMARY OF THE INVENTION

A tarnish inhibiting polymer composition is effective to protect a surface of a silver object, when the surface is exposed to the composition in a sealed environment which contains molecular-oxygen and hydrogen sulfide in a concentration in the range from 1 ppb (parts per billion) to 10 ppm (parts per million) sulfide at a relative humidity of 90% and 37.4° C. (100° F.), for at least one year. The composition consists essentially of a substantially non-hydrolyzable polymer in which from about 0.01% to 5% by weight of an essentially anhydrous scavenger selected from the group consisting of an alkali metal silicate and zinc oxide, is substantially homogeneously dispersed, optionally with from 0 to 1% of an inert adjuvant, provided that the polymer has a water vapor transmission rate (WVTR) at least as high as that of low density polyethylene.

Despite no readily evident connection to each other as a scavenger for hydrogen sulfide and sulfur dioxide, zinc oxide, a particular amphoteric oxide of Group 2 of the Periodic Table, and sodium and potassium silicates of Group 1a, compared with oxides of other Groups, e.g. Group 2a, are each exceptionally effective to intercept and scavenge the gases in the presence of molecular oxygen and moisture, when the compounds are dispersed in an essentially non-hydrolyzable synthetic resin ("polymer") having a relatively high WVTR, at least as high as that of low density PE. By "essentially non-hydrolyzable" is meant that the polymer is not hydrolyzed more than 5% under conditions at which an object to be protected is stored in the film. The term "scavenger" identifies a compound added to the polymer to counteract the undesirable effect of sulfur-containing gases after they have been intercepted in the polymer containing the scavenger.

As little as from 0.1 to 5 parts per hundred parts (phr), preferably in the range from 0.1 to 3 phr, of a scavenger selected from the group consisting of finely divided zinc oxide and a silicate of an alkali metal, is unexpectedly effective to combat tarnishing of a lustrous silver object.

The effectiveness of either zinc oxide or sodium silicate is unexpected because there is no reason to believe that these ingredients in their usual stable essentially anhydrous form might react with either sulfur dioxide and/or hydrogen sulfide and function as an interceptor and scavenger; further, the WVTR of the novel film which contains the TI ingredient, is essentially the same as that of conventional PE film with no TI ingredient (as shown in Table 1 below). Since a lower WVTR with the polymer containing the TI ingredient, would appear to provide a theoretical basis upon which to expect better protection against tarnishing, no decrease in the WVTR provided a reasonable basis not to use one or more of these ingredients as essential TI ingredients.

Effectiveness of protection against tarnishing provided by a TI ingredient in a polymer, is predicated more particularly upon the interception of hydrogen sulfide by less than 3 phr of either an oxide of zinc, and/or, a silicate of an alkali metal, preferably sodium. Substitution of an oxide of another Group 2 element, e.g. calcium oxide, for a portion of the zinc oxide fails to improve the protection provided by the same concentration of zinc oxide alone.

By "inert adjuvant" is meant an agent added in an amount preferably less than 0.5% by weight of the recipe of active TI ingredient(s) and polymer, to aid or modify its effect or its dispersability in the polymer, or stability, without chemically reacting with the TI ingredient. Though finely divided solid particles may be directly dispersed in a polymer, they are not homogeneously dispersed unless sufficiently "wetted" by the molten polymer. To do this, it is preferable, first to distribute the particles in a first polymer which wets the particles sufficiently to have them homogeneously distributed in the first polymer, thus forming a concentrate. The concentrate is preferably committed and macrogranules of the concentrate are then mixed with a second or diluent polymer to form a thermoformable mixture which is conventionally extruded, or injection- or blow-molded. A typical adjuvant may be chosen from one or more of the following: a dispersant such as fumed silica and calcium carbonate present in an amount in the range from 0.01% to 1% by weight, an emulsifier, perfume, coloring dye, surfactant, processing aid, bactericide, opacifier and the like. An opacifier may be added if the film is required deliberately to hide the stored material from view. Substituting a small quantity of an oxide of another metal, or alkaline earth metal, for some or all of a scavenger does not improve the protection afforded by the scavenger in the same concentration.

DETAILED DESCRIPTION OF PREFERRED EMBODIMENTS

When zinc oxide or an alkali metal silicate is incorporated in the aforesaid polymer, sufficient water molecules are trapped in the polymer to allow the moistened ingredients to function as a scavenger for hydrogen sulfide and/or sulfur dioxide, which, in combination with moisture and molecular oxygen, result in tarnishing of lustrous silver surfaces.

Each of the foregoing essentially anhydrous TI ingredients is shown to be effective in an atmosphere containing at least trace amounts of moisture and hydrogen sulfide; this is confirmed in a qualitative comparison carried out in sealed jars ("jar tests") where the surfaces of specimens are compared visually. The jar tests indicate that excellent protection is provided by either TI ingredient, or a combination of them when a lustrous silver surface is exposed to hydrogen sulfide and/or sulfur dioxide.

Moreover each of the ingredients scavenges sulfur dioxide and/or hydrogen sulfide entering the film or container, and at least initially, for a period of several months, depending upon the thickness of the film and the concentration of the TI, provides protection against tarnishing of lustrous silver surfaces which is unexpectedly superior to that provided by conventional film. Eventually, after the initial period, at equilibrium, the WVTR reverts to the value of TI-free film.

Both the particle size and the amounts of the TI ingredient, present as powder in the polymer, are critical if the finished polymer is to be substantially light permeable, that is, essentially transparent. Transparency, without substantially embrittling the film, additionally requires that the powder be substantially homogeneously dispersed, in an amount stated above, a limitation which can only be met when the powder ingredient which remains in the solid state after the film or other substrate is thermoformed, and has a primary particle size smaller than 53 μm (micrometer; No. 270 Standard Test Sieves—wire mesh), preferably in the range from about 1 μm to 45 μm (No. 325).

Though substantially homogeneously dispersed, the finely divided zinc oxide or alkali metal silicate is present in so small an amount that it fails to decrease the WVTR of PE-TI polymer in which the TI is dispersed; and the protection is provided without substantially affecting the physical properties of TI-free film of the same thickness.

A silver object may now be protected against tarnishing for a chosen period, typically up to four or more years, by sealing it in a TI-film having a thickness sufficient to have substantially uniformly dispersed therewithin, enough TI ingredient to provide the necessary scavenging duty over the chosen period. The thickness of film is typically limited to 0.20 mm (8 mils) because it is generally unnecessary to include a larger amount of the TI ingredient in the TI-film for a period of up to 5 years (that is, if used at the preferred concentrations which provide the appropriate protection); and, because uniformity of dispersion in a preferred range of concentration is difficult to control in thicker cross-sections.

"Film" which provides protection for four years is typically less than 0.20 mm (8 mils) thick, and such film may be thermoformed into a container with relatively rigid walls. Where protection is required for more than four years; or, extreme protection against water vapor is demanded and WVTR is an overriding criterion; or, when structural rigidity is a primary concern; or, if strength and damage due to tearing are key considerations, the "film" may be as thick as 1.25 mm (50 mils). Though, inevitably a substantial portion of the TI is present at or near the surface of the film, it is essential that the major portion of the TI be held within the film. This distribution ensures better scavenging when the TI at or near the surface is used up.

By "uniformity of dispersion" is meant that the uniformity of dispersed particles in the film may be quantified by known microscopic techniques, or by a blown film test. In the blown film test, the polymer containing solid powder particles is extruded through a blown film apparatus which produces a film about 0.025 mm (1 mil) thick, and this film is placed over a light source of appropriate wavelength and intensity to enable one to quantify the number of particles which show up as "imperfections"; and the size of each is also visible.

By "silicate of sodium" reference is made to essentially anhydrous sodium orthosilicate, sodium metasilicate, sodium disilicate, sodium trisilcate, and the like in crystalline or glassy states. Most preferred is a powdered silicate such as is commercially available from PQ Corporation. Though silicates of other alkali metals are usable, they are less preferred either because they are too hygroscopic, are difficult to grind into a powder with particles in the desired size range, or inadequate effectiveness as an interceptor.

Light-permeable films of numerous thermoplastic polymers may be used as the substrate within which the Tis are dispersed, such polymers including low density PE, polyester such as Mylar®, poly(vinyl chloride), polystyrene, and polyamides such as Nylon 6, listed in order of increasing WVTRs measured per mil thickness and 645 $cm^2$ (100 $in^2$) area at 37.4° C. (100° F.) and 90% RH (relative humidity). WVTRs range from about 0.5 gm/24 hr for low density PE to 8 gm/24 hr for Nylon 6. By "low density" PE is meant that the PE has a density less than 0.943 g/cc. Less favored are films of polycarbonate, polyurethane and polybutene-1.

Preferred biodegradable polymer films include star ε-caprolactone, and commercially available films such as linear ε-caprolactone (PCL) (from Union Carbide as PCL TONE 787); poly(hydroxybutyrate-co-valerate) (PHBV), containing 8, 16 and 24% valerate (from Imperial Chemical Industries (Zeneca), Bill ingham, UK; uncoated- and nitrocellulose-coated cellophane films (from DuPont, Wilmington, Del.); crosslinked chitosan (Protan Laboratories, Redmond, Wash.) produced by reaction with epichlorohydrin; starch/ethylene vinyl alcohol (St/EVOH) blend films and pure EVOH film (38 mole percent ethylene) (from Novamont, Novara, Italy and EVALCo, Lisle, Ill., respectively); and polycaprolactone (PCL), molecular weight about 80,000 Daltons (from Union Carbide, Bound Brook, N.J.).

Less favored non-biodegradable films include polycarbonate, polyurethane and polybutene-1. The choice of film depends upon the strength and flexibility requirements of the container in which the steel or cast iron objects are to be shipped, the length and degree of protection to be afforded, both from acid gases in the environment and from rough handling, the humidity of the particular environment in which the package is to be stored, and economic considerations. Most preferred films which are permeable to vapors of the active ingredients, include LDPE, PP, copolymers of two or more lower $C_2$-$C_8$ olefins, copolymers of a lower $C_2$-$C_8$ olefin and ethylene/vinyl alcohol, and ε-caprolactone, both linear and star; such films are also chosen where a high degree of flexibility is required. Containers with relatively rigid, light-permeable and thin sidewalls, less than 0.25 mm (10 mils), with from 0.01 to 1 phr (parts per hundred parts by weight of polymer) of each VCI active ingredient are preferably formed of polystyrene or polyester.

The choice of film depends upon the strength and flexibility requirements of the container in which the silver objects are to be shipped, the length and degree of protection to be afforded, both from hydrogen sulfide and acid gases in the environment and from rough handling, the humidity of the particular environment in which the package is to be stored, and economic considerations. Most preferred films which are permeable to hydrogen sulfide and sulfur dioxide include low density PE, PP, copolymers of two or more lower olefins and ethylene/vinyl alcohol copolymers; such films are also chosen where a high degree of flexibility is required. Containers with relatively rigid, light-permeable and thin sidewalls, less than 0.25 mm (10 mils), with from 0.75 phr to 1 phr of each TI ingredient are preferably formed of polystyrene or polyester. Additives such as glass fibers may be used to reinforce the film, and an inert adjuvant and/or processing aid such as a plasticizer or processing oil, may optionally be included; a colorant, deodorant or scent, inert filler, and any other conventional additive, may also be added so long as the additive does not adversely affect the polymer's physical properties or scavenging of the TI ingredient, and, in those instances where transparency of the polymer is required, does not affect the transparency.

Unless powder of the TI ingredient can be readily directly dispersed to yield the TI-polymer, it is desirable first to make a concentrate. The powder is dispersed in finely divided polymer, typically LDPE or Microthene® FE 532 particles which is miscible in diluent polymer, using a blender, and the blend fed into the hopper of an extruder. The blend is extruded to form a concentrate in the form of pellets in the size range from about 3 mm (0.125") to 9 mm (0.375"), pelletized from a thin extruded rod. The pellets contain a high concentration of TI solid powder in the range from 10 to 50 phr. To make the TI-containing polymer, a chosen amount of the pellets, in turn, are homogeneously dispersed with the diluent polymer such as LDPE powder in a blender, and the mixture fed to the hopper of a thermoforming means. A conventional film extruder may be used to extrude finished film diluted to contain the above-specified concentrations of the active TI ingredient.

Comparison of WVTRs of Plain PE and PE-TI Films:

In accordance with the test procedure set forth in ASTM E 96, a comparison of the WVTRs is obtained with PE film and PE-TI film of this invention; each of the films is extruded in a thickness of about 0.1 mm (4 mils) by first making a concentrate in a LDPE such as LDPE DuPont 20-6064, or linear low density LLDPE Dowlex 2535, or Microthene® FE 532 ethylene/vinyl acetate copolymer, then diluting a portion of the concentrate in Equistar 940-094 LDPE and melt-forming the mixture. Because the concentration of copolymer in the extruded film is less than 7%, the finished film is referred to as "TI-PE film" in which the TI ingredients are dispersed. "Plain PE film" is purchased LDPE film, such as of Equistar 940-094 believed to contain less than 100 ppm of BHT.

First, a 45.45 Kg (100 lb) lot of pellets is made with a TI ingredient and Microthene FE 532 in the following amounts:

| | |
|---|---|
| TI ingredient | 25% |
| Microthene FE 532: | 75% | to form a concentrate particularly adapted to be diluted in a polymer in which the TI ingredient will be essentially homogeneously dispersed.

To extrude film tailored to protect silver objects for at least one year under cyclic temperature conditions in the range from 0° C. to 50° C. and 95% RH in a moist molecular oxygen-containing atmosphere contaminated with hydrogen sulfide, 1.363 Kg (3 lb) of the pellets are blended with 44.1 Kg (97 lb) of plain PE to extrude a batch of 45.45 Kg (100 lb) of PE-TI film. The finished PE-TI-film, 0.1 mm (4 mils) thick, contains 0.75% of the TI whether zinc oxide or sodium disilicate.

Both TI ingredients may be combined to form a concentrate containing: sodium disilicate, 25%; zinc oxide 25%; and Microthene FE 532, 50%.

0.909 Kg (2 lb) of the concentrate is then diluted with 45.45 Kg (100 lb) of plain PE and extruded to provide 0.5% each TI ingredient (total 1%), by weight of finished PE-TI film. A concentrate of calcium oxide is also made and appropriately diluted to provide extruded PE-TI film having concentrations of 1.0%.

The results of comparisons presented below use "plain PE" (identified above) and "PE-TI" film.

Tests to Determine WVTR:

Samples of each film containing each of the TI ingredients in the concentrations given above are cut to fit over cups, each with an exteriorly threaded opening 7.62 cm (3") in diameter. Five samples are cut from films of varying thicknesses in the range from about 0.4375 mm (3.5 mil) to 0.525 mm (4.2 mil) thick and the readings for the five are averaged. The cups are each filled with identical weights of calcium chloride and each sample is secured on a cup with an internally threaded cap which is screwed on to seal the material within each cup. The cups are then placed in an oven having an atmosphere at a relative humidity in the range form 90-95% and at a temperature of 37.2° C. (100° F.). The cups are removed from the oven at intervals and weighed to determine the average weight gain (difference in weights before and after), and average WVTR of each as follows:

TABLE I

Comparison of WVTRs

| Film | After 68 hr | After 118 hr |
|---|---|---|
| Plain PE | 0.3552 gm/100 in²/24 hr | 0.3638 gm/100 in²/24 hr |
| PE-TI | 0.345 gm/100 in²/24 hr | 0.346 gm/100 in²/24 hr |

The results are substantially the same whether the TI is zinc oxide or sodium disilicate in 0.75% concentration.

From the foregoing it is evident that there is essentially no significant difference in the WVTRs of the films compared. Since there is no evident difference there was no reason to expect that either zinc oxide or a silicate of sodium would provide a high scavenging ability for the gases.

Investigation of the Effect of Sulfur Dioxide on Tarnishing:

The following results are obtained in tests to determine the extent of tarnishing, if any, on highly polished and dried sterling silver spoons, due to sulfur dioxide in the absence of hydrogen sulfide.

The tests are carried out with the silver spoons held in bags in 1 gallon glass jars which can be sealed with lids. Each spoon is bagged in a film to be tested but spaced apart from the film, and the bagged sample is suspended in a jar. All test films, except the plain PE, contained a combination of zinc oxide and sodium disilicate TI ingredients, each in a concentration of 0.5% for a total of 1%. The finished PE-TI film is 0.1 mm (4 mils) thick and transparent.

The following test procedure describes one cycle: Successive cycles are repeated by replacing the solutions in the chamber after each cycle. Each 24 hr cycle starting is repeated at a temperature of 50° C. for 16 hr in the chamber, and a temperature of 23° C. for 8 hr outside the chamber in an ambient atmosphere. The spoons are not removed from the bags after each cycle, but visually inspected, because the film retained its transparency.

30 ml of a test solution (1% $Na_2SO_4$+1% $NH_4Cl$ in deionized water) is poured into a 50 ml plastic beaker and placed in each wide-mouth glass gallon jar to maintain an atmosphere of about 95% RH. Separately, place 0.04 g of $Na_2S_2O_3 \cdot 5H_2O$ in a 20 ml plastic beaker and place the beaker in the jar. Then add ml of 0.1N $H_2SO_4$ to the sodium hyposulfite in the beaker and immediately seal the mouth of the jar with the lid so that the bagged spoons are vertically suspended within the jar and the film wrapping each coupon is exposed to the sulfur dioxide being generated. The concentration of sulfur dioxide is about 0.2% in the atmosphere in the jar.

The sealed jars are then placed in an oven at 50° C. for 16 hr after which the jars are removed and held at room temperature (23° C.) for 8 hr. This cycle is repeated and the spoons visually inspected until signs of surface staining due to tarnishing are evident. On a scale of 1 to 10 where 1 represents a surface indistinguishable from the initial virgin finish, and 10 represents an average severe corrosion suffered by metal coupons wrapped in comparison PE film unprotected with TI ingredients, the following results were noted after 7 cycles:

| Plain PE film | PE film with TI ingredients |
|---|---|
| 1 | 1 |

The tests provide evidence that plain PE, which is permeable to sulfur dioxide, produces no visible tarnishing over a period of one week in the absence of hydrogen sulfide. Scavenging the sulfur dioxide to negate tarnishing in the absence of hydrogen sulfide, is therefore unnecessary.

Effect of Hydrogen Sulfide:

A qualitative comparison of the effectiveness of the TIs in PE film is made by placing highly polished sterling silver spoons in bags made of PE-TI film and placed in a moist oxygen-containing atmosphere, RH 95%, in which the concentration of hydrogen sulfide, determined by the concentration of ammonium sulfide solution which is sealed in each test jar, is in excess of 1000 ppm.

Preparation of Ammonium Sulfide Solution:

A 20% by weight solution of ammonium sulfide in deionized water is prepared (or obtained from Aldrich Chemical, #30, 941-9); 1 ml of the solution is diluted with 99 ml of deionized water to yield a 0.2% by weight concentration. 10 ml of the diluted solution is placed in the bottom of a quart jar.

The Test:

Transparent plain PE film, and each transparent PE-TI-film to be tested is made into a bag adapted to have a sterling silver spoon pendantly, centrally placed in it so that the silver surfaces are spaced apart from the polymer. Each spoon is polished to a high luster, dried in hot air, and hung in a bag which is then sealed. The bag is then hung in the jar above the surface of the solution, one spoon in each bag, and one bag in each jar. A statistically significant number (three) of duplicate samples are run.

The severity of tarnishing is quantified numerically on a scale from 1 to 10, the higher the severity of tarnishing, the higher the number accorded.

Each bag is removed and visually inspected every 30 min. At the end of 2 hr the samples in the plain PE bags were so heavily tarnished as to rate "10". Observations of the comparative severity of tarnishing were therefore stopped after 2 hr.

The average results after 2 hr for each of the test films are set forth below:

| Ingredient in PE-TI film | Conc. of ingredient | Observed tarnishing |
|---|---|---|
| Sodium disilicate | 0.75% | 2–3 |
| Zinc oxide | 0.75% | 1 |
| Sodium disilicate and zinc oxide | 0.5%) 0.5%) | 2 |
| Calcium oxide | 1.0% | 3–4 |

It is evident that calcium oxide at 1% provides some protection against tarnishing but is substantially less effective compared to a combination of sodium disilicate and zinc oxide present in the same concentration; and either zinc oxide or sodium disilicate, present in 0.75% concentration, is more effective than calcium oxide at 1%. This indicates that though oxides of Group 2a of the Periodic Table exhibit significant scavenging of hydrogen sulfide, they are not as efficient as zinc oxide or a silicate of an alkali metal.

While certain representative embodiments and details have been shown for the purpose of illustrating the invention, it will be apparent to those skilled in this art that various changes and modifications may be made therein without departing from the spirit or scope of the invention.

What is claimed is:

1. A tarnish inhibiting composition consisting essentially of a substantially non-hydrolyzable polymer having substantially homogeneously dispersed therein from about 0.01% to 5% by weight of an essentially anhydrous scavenger including an alkali metal silicate and zinc oxide and optionally from 0.01 to 1% by weight of an inert adjuvant, provided that the polymer has a water vapor transmission rate (WVTR) at least as high as that of low density polyethylene.

2. The composition of claim 1, wherein the polymer includes low density polyethylene, polypropylene, ethylene/vinyl acetate copolymer, copolymers of lower $C_2$-$C_8$ olefins, copolymers of a lower $C_2$-$C_8$ olefin and ethylene/vinyl alcohol, non-biodegradable polyester, poly(vinyl chloride), polystyrene, or polyamide, or combinations thereof.

3. A tarnishing inhibiting composition comprising: a substantially non-hydrolyzable polymer having substantially homogeneously dispersed therein from about 0.01% to 5% by weight of an essentially anhydrous scavenger including an alkali metal silicate and zinc oxide and optionally an inert adjuvant, provided that the polymer has a water vapor transmission rate (WVTR) at least as high as that of low density polyethylene, and wherein said non-hydrolyzable polymer is a biodegradable polymer comprising a star ε-caprolactone; ε-caprolactone (ε-PCL); poly(hydroxybutyrate-co-valerate) (PHBV); an uncoated- or nitrocellulose-coated cellophane film; crosslinked chitosan; starch/ethylene vinyl alcohol (St/EVOH) blend film; pure EVOH film (38 mole percent ethylene); or polycaprolactone (PCL).

4. The composition of claim 3, wherein the alkali metal silicate is a silicate of sodium.

5. The composition of claim 4, wherein the total amount of said scavenger is from about 0.1% to 3.0% by weight.

6. The composition of claim 5, wherein said silicate of sodium and said zinc oxide each, independently, have a primary particle size of from 1 to 53 microns.

7. The composition of claim 6, including the adjuvant, wherein the adjuvant comprises calcium carbonate present in an amount of from 0.01% to 1% by weight, wherein said calcium carbonate has a primary particle size in the range from about 1 micron to 53 microns, and wherein said calcium carbonate is substantially homogeneously dispersed in said polymer.

8. The composition of claim 1, wherein the alkali metal silicate is a silicate of sodium.

9. The composition of claim 8, wherein said silicate of sodium and said zinc oxide, independently, have a primary particle size in the range from about 1 μm to 53 μm.

10. The composition of claim 9, wherein the total amount of said scavenger is from about 0.1% to about 3% by weight.

11. The composition of claim 2, wherein the alkali metal silicate is a silicate of sodium, wherein the total amount of said scavenger is from about 0.1% to about 3% by weight.

12. The composition of claim 11, wherein the primary particle size of said silicate of sodium and said zinc oxide, independently, is from about 1 μm to 53 μm.

13. The composition of claim 1, said composition being capable of protecting a surface of a silver object containing in excess of 90% silver, when the surface is exposed to the composition in a sealed environment, against tarnishing in a molecular-oxygen containing atmosphere containing in the range from 1 ppb (parts per billion) to 10 ppm (parts per million) of hydrogen sulfide at a relative humidity of 90% and 37.4 °C. (100° F.), for at least one year.

14. The composition of claim 3, said composition being capable of protecting a surface of a silver object containing in excess of 90% silver, when the surface is exposed to the composition in a sealed environment, against tarnishing in a molecular-oxygen containing atmosphere containing in the range from 1 ppb (parts per billion) to 10 ppm (parts per million) of hydrogen sulfide at a relative humidity of 90% and 37.4° C. (100° F.), for at least one year.

15. The composition of claim 6, said composition being capable of protecting a surface of a silver object containing in excess of 90% silver, when the surface is exposed to the composition in a sealed environment, against tarnishing in a molecular-oxygen containing atmosphere containing in the range from 1 ppb (parts per billion) to 10 ppm (parts per million) of hydrogen sulfide at a relative humidity of 90% and 37.4° C. (100° F.), for at least one year.

16. The composition of claim 10, including the adjuvant, wherein the adjuvant comprises calcium carbonate in an amount of from 0.01% to 1% by weight and having a primary particle size in the range of from about 1 micron to 53 microns.

17. The composition of claim 12, including the adjuvant, wherein the adjuvant comprises calcium carbonate in an amount of from 0.01% to 1% by weight and having a primary particle size in the range of from about 1 micron to 53 microns.

18. The composition of claim 3, wherein said composition consists essentially of said biodegradable polymer, said scavenger, and said inert adjuvant.

* * * * *